(12) United States Patent
Limpert et al.

(10) Patent No.: US 11,878,379 B2
(45) Date of Patent: Jan. 23, 2024

(54) APPARATUS FOR FASTENING A COMPONENT TO A CARRIER COMPONENT

(71) Applicant: ILLINOIS TOOL WORKS INC., Glenview, IL (US)

(72) Inventors: Alexander Limpert, Weikersheim (DE); Oscar Medina, Bad Mergentheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 25 days.

(21) Appl. No.: 17/750,975

(22) Filed: May 23, 2022

(65) Prior Publication Data

US 2022/0379415 A1 Dec. 1, 2022

(30) Foreign Application Priority Data

May 25, 2021 (DE) ...................... 10 2021 113 469.2
Apr. 8, 2022 (DE) ...................... 10 2022 108 601.1

(51) Int. Cl.
*F16B 37/08* (2006.01)
*B23P 19/04* (2006.01)

(52) U.S. Cl.
CPC .......... *B23P 19/04* (2013.01); *F16B 37/0864* (2013.01)

(58) Field of Classification Search
CPC .......................... F16B 37/0857; F16B 37/0864
USPC .......................................... 411/265–267, 433
See application file for complete search history.

(56) References Cited

U.S. PATENT DOCUMENTS

| 1,475,907 | A | * | 11/1923 | Volman | F16B 37/0864 279/7 |
| 4,659,273 | A | * | 4/1987 | Dudley | F16B 41/005 411/429 |
| 5,651,632 | A | * | 7/1997 | Gordon | F16B 21/06 411/338 |
| 5,775,860 | A | * | 7/1998 | Meyer | F16B 19/1081 411/41 |
| 5,947,669 | A | * | 9/1999 | Schaty | F16B 37/0842 411/339 |

(Continued)

FOREIGN PATENT DOCUMENTS

| DE | 202005018240 U1 | 4/2006 |
| DE | 102017117002 A1 | 1/2019 |
| EP | 2481935 A1 | 8/2012 |

*Primary Examiner* — Flemming Saether
(74) *Attorney, Agent, or Firm* — THOMPSON HINE LLP (57) ABSTRACT

Apparatus for fastening a component to a carrier component, in particular a body part, includes a base body, wherein the base body includes an actuating element via which the apparatus can be subjected to a force acting in the assembly direction in order to transfer the apparatus from a pre-assembly position into a final assembly position, wherein the assembly direction extends orthogonally to a surface of a carrier component, and wherein the actuating element comprises at least one catching element, which, in the pre-assembly position, engages with a correspondingly formed pre-assembly catching element of the base body and, in the final assembly position, engages with an assembly catching element of the base body, wherein a connection of the catching element to the assembly catching element verifies that the final assembly position is reached, such that the actuating element forms a visual assembly verification device.

9 Claims, 4 Drawing Sheets

(56) References Cited

U.S. PATENT DOCUMENTS

| | | | | |
|---|---|---|---|---|
| 6,533,515 B2* | 3/2003 | Meyer | ............... | F16B 19/1081 |
| | | | | 24/453 |
| 6,974,291 B2* | 12/2005 | Li | ............... | F16B 37/0864 |
| | | | | 411/429 |
| 7,331,745 B2* | 2/2008 | Giehl | ............... | F16B 37/0864 |
| | | | | 411/433 |
| 8,348,578 B2* | 1/2013 | Busch | ............... | F16B 37/0864 |
| | | | | 411/433 |
| 10,677,281 B2* | 6/2020 | Albach | ............... | F16B 37/16 |
| 2013/0302112 A1* | 11/2013 | Scherer | ............... | F16B 37/08 |
| | | | | 411/433 |

* cited by examiner

APPARATUS FOR FASTENING A COMPONENT TO A CARRIER COMPONENT

TECHNICAL FIELD

The present invention relates to an apparatus for fastening a component to a carrier component, in particular a body part of a motor vehicle.

BACKGROUND

In DE 10 2017 117 002 A1, an apparatus for fastening a component to a carrier component is disclosed.

EP 2 481 935 B1 describes a fastening clip. It is provided here that a machine-readable code can only be read correctly by a reading device when the fastening clip is in its final assembly position and a separate verification pin has been inserted into the clip in its entirety.

DE 20 2005 018 240 U1 describes a catching connector that cooperates with a retaining clip, wherein the catching connector is initially inserted into the retaining clip only up to a pre-fixation position. During final assembly, the catching connector is pushed further into the retaining clip, wherein two hooks arranged on the retaining clip catching over an end portion of the catching connector that were previously obscured by the catching connector, so that a visual inspection of an end assembly position is possible.

SUMMARY

The problem of the present invention is to provide an alternative apparatus for fastening a component to a carrier component.

A further problem of the present invention is to provide an apparatus for fastening a component to a carrier component that allows for a final assembly position of the apparatus to be verified in a simple manner.

In addition, it is a problem of the present invention to provide an apparatus for fastening a component to a carrier component that allows for a predetermined bias to be applied to the apparatus or to a component fastened thereto.

According to the invention, an apparatus is provided for fastening a component to a carrier component, in particular a body part. This comprises a base body, wherein the base body comprises first catching means for fastening the apparatus to a carrier component and an actuating element via which the apparatus can be subjected to a force acting in the assembly direction in order to transfer the apparatus from a pre-assembly position into a final assembly position, wherein the assembly direction extends orthogonally to a surface of a carrier component, and wherein the actuating element comprises at least one catching element, which, in the pre-assembly position, engages with a correspondingly formed pre-assembly catching element of the base body and, in the final assembly position, engages with an assembly catching element of the base body, wherein a connection of the catching element to the assembly catching element verifies that the final assembly position is reached, such that the actuating element forms a visual assembly verification device.

With the apparatus according to the invention, an apparatus for fastening a component to a carrier component is provided, which apparatus comprises an assembly verification device that is extremely simple in construction and effective in action.

Apparatus for fastening a component to a body part often do not comprise any assembly verification devices. Therefore, there is no possibility of verifying a correct assembly of such an apparatus or a component connected thereto on a carrier component. In such apparatuses, however, a correct assembly is extremely important, because further components can be fastened to the apparatus.

Accordingly, it is provided according to the invention that, after transferring the apparatus from a pre-assembly position into a final assembly position, a visual feedback of the apparatus is provided that indicates whether the apparatus is correctly fastened on a carrier component, in particular a body part, in the final assembly position.

In particular, the apparatus can comprise two or four or more first catching means lying opposite one another.

By providing a plurality of catching means, a secure connection between the actuating element and the base body is enabled.

The pre-assembly catching element and the fastening catching element can be arranged axially offset from one another in the assembly direction such that, due to this offset, the apparatus has a lower construction height in the assembly direction in the final assembly position than in the pre-assembly position, so that the final assembly position is visually verifiable.

The apparatus according to the invention thus not only has a lower construction height in the assembly direction, but also a lower volume, because the base body is further arranged or received in the actuating element, and thus the total volume of the apparatus is significantly reduced. This reduction in size can be easily recognized or visually verified.

A plurality of spring elements can be arranged approximately equally spaced apart from one another on the base body radially circumferentially, which are inclined approximately radially and orthogonally to the assembly direction and in particular at a predetermined angle to the assembly direction and extend in such a way that the apparatus and a component fastened at or to the apparatus in the final assembly position can be subjected to a spring force acting counter to the assembly direction, wherein a retaining force between the catching element of the actuating element and the pre-assembly catching element of the base body in the pre-assembly position is greater than the total spring force of all spring elements, such that the actuating element is only transferable into the assembly position and its catching element is accordingly only engageable with the assembly catching element of the base body when the spring elements are biased in such a way that the apparatus can be subjected to a predetermined force acting counter to the assembly direction.

In order to prevent components, such as interior trim parts, from unintentionally becoming loose from a corresponding body part or wobbling and causing noises during operation, the spring elements are provided, which apply a spring force acting counter to the assembly direction to the apparatus and a component fastened thereto.

A desired or predetermined spring force can be provided by a suitable choice of the spring hardness of the spring elements.

By providing the spring elements, in particular in connection with the assembly verification device, it is ensured that the apparatus is securely fixed to a carrier component in the final assembly position with the desired or predetermined biasing.

Further, the spring elements can have sharp contact edges for contacting a surface of a carrier component, which surface is formed in order to allow the contact edges to penetrate into a surface of the carrier component upon unscrewing of the apparatus.

By having the sharp contact edges formed such that the contact edges penetrate into a surface of the carrier component upon disassembly of the apparatus, an unintended loosening is at least avoided or even prevented.

The base body can comprise a receiving portion for receiving a retaining device connected to the carrier component, wherein the first catching means extends radially inward from an inner sheath wall of the receiving portion, and wherein the retaining device comprises second catching means that are formed to correspond to the first catching means of the base body.

The first and second catching means can be formed as corresponding catching elements with catching tabs, as full or partial threads, as a clip connection or other suitable catching elements. In the final assembly position, the first catching means can be fully engaged with the second catching means of the retaining device, so that the retaining device is completely received in the receiving portion of the base body and connected to it via the catching means.

In the context of the present invention, the full engagement of the first and second catching means is understood to mean that the retaining device is completely arranged in the receiving portion of the base body and, if present, the spring elements rest nearly fully on the surface of the carrier component, and thus the final assembly position is achieved.

If the first and second catching means are formed as full or partial threads, it is provided that at least two or three or more threads of the first catching means are engaged with the second catching means of the retaining device.

In principle, not all provided first catching means need to be engaged with the correspondingly formed second catching means. It is sufficient for the final assembly to be effected safely and reliably.

The retaining device can be approximately cylindrical and the receiving portion of the base body can have a correspondingly formed cylindrical recess. Accordingly, a threaded bolt or the like is preferably provided as a retaining device.

The base body can comprise a bracket-like fastening element that is arrangeable in a correspondingly formed fastening element receptacle of the base body, wherein the fastening element comprises the receiving portion and comprises the first catching means for fastening the apparatus to a carrier component.

The base body can thus be formed in two parts, wherein the fastening element can also be connected to the base body.

Furthermore, the base body can also be integrally formed, which means that the first catching means is integrally formed on the base body and the receiving portion is directly formed in the base body.

According to the type of clip, the bracket-like fastening element can be inserted into and optionally connected to the correspondingly formed fastening element receptacle of the base body.

The fastening element can be connected to the actuating element via two spring means in order to compensate for tolerances. Alternatively, the fastening element can also be formed as a separate component.

A movement of the fastening element can be guided for connecting to a retaining device via a guide device, wherein guide grooves and guide pins, formed correspondingly on the fastening element and guided into the guide grooves, are formed on the base body in order to guide a movement of the fastening element first in the assembly direction and then radially inwardly in the direction of the retaining device, such that the arms of the bracket-like fastening element can become engaged with the first catching means formed thereon with the second catching means of a retaining element.

A good catching is ensured by the fact that the bracket-like fastening element is guided toward the retaining device by means of the guide device. In addition, this causes all first catching means to be fully engaged with all second catching means, depending on the configuration.

The assembly verification device can comprise a release arm formed on the base body, being pivotally hinged to the base body, wherein a first end of the arm is formed in order to contact a surface of a carrier component in such a way that the release arm can be set into a pivoting motion by contacting a surface of the carrier component, wherein a second end of the arm contacts the actuating element in the pre-assembly position in such a way that the actuating element is fixed in the assembly direction, and wherein the second end releases the actuating element by the pivoting movement, such that it is slidable in the assembly direction.

In this way, a change in the pre-assembly position or a positioning of the individual components of the apparatus, namely the base body, the actuating element, and the fastening element, is safely and reliably prevented. This means that the first catching means cannot be loosened from the connection to the pre-assembly catching means as long as the release arm blocks the actuating element. Only when the actuating element is subjected to a force acting in the assembly direction is the actuating element released, so that, as soon as the apparatus is subjected to a predetermined spring force acting in the assembly direction, it can be moved in the assembly direction and can verify the final assembly position.

Furthermore, a stop apparatus can be provided, which limits a movement of the actuating element in the assembly direction, wherein a stop recess that flares in the assembly direction is formed [on the] base body and a stop element that conically flares in the assembly direction is formed [on the] actuating element, which together form the stop apparatus.

The stop apparatus safely and reliably prevents the actuating element from applying too high an assembly force on the base body and thus the spring elements, thereby causing damage to the apparatus.

A component to be fastened, for example an interior trim part of a motor vehicle, can be connected to the base body, wherein the connection is preferably formed integrally and is manufactured by means of a single-component or multi-component injection molding process.

Furthermore, according to the present invention, a method for manufacturing an apparatus as described above is provided, wherein a base body and/or an actuating element and/or preferably a fastening element are manufactured in at least one or more injection molding operations in a single injection molding apparatus, wherein this injection molding apparatus can be a component of a production system, in which the aforementioned components are arranged in a pre-assembly position with respect to one another.

In this way, the apparatus according to the invention can be easily manufactured. In addition, no further assembly steps are necessary in order to provide the pre-assembly position. A corresponding component can thus be delivered to a customer immediately after manufacture.

BRIEF DESCRIPTION OF THE DRAWINGS

The present invention will now be described on the basis of two exemplary embodiments shown in the figures. The figures show.

DETAILED DESCRIPTION

A fastening apparatus 1 according to the invention for fastening a component (not shown) to a carrier component 2, in particular a body part, is described in more detail in the following on the basis of a first exemplary embodiment (FIGS. 1-5).

The apparatus 1 comprises a base body 3 and an actuating element 4 as well as a fastening element 5.

The fastening element 5 can be an integral component of the base body, i.e., connected to it integrally, or connected to the base body 3 in a home position, wherein the connection is loosened from a home position upon the transfer into a pre-assembly position or is also formed as a completely separate component.

According to the first exemplary embodiment, the fastening element 5 is not connected to the base body 3.

The base body 3 comprises a base wall 6, on which spring elements 7 extending in the assembly direction 8 and in the radial direction extend outwardly. The spring elements are radially circumferential and are form on the base body 3 spaced apart approximately equally from one another.

In the context of the present invention, an assembly direction 8 is understood to mean a direction that is arranged rectangularly or orthogonally to a surface of the carrier component 2 and extends in the direction of the carrier component 2.

With respect to the base wall 3, approximately rectangularly extending and oppositely arranged catching walls 9 are formed on the base wall 6. A pre-assembly catching element 10 and a fastening catching element 11 are respectively formed on the two opposite catching walls 9.

The pre-assembly catching element 10 is arranged behind the fastening catching element 11 in the assembly direction.

Furthermore, the pre-assembly catching element 10 and the fastening catching element 11 are connectable to corresponding catching members 12 of the actuating element for connecting the base body 3.

The actuating element 4 is formed in order to be approximately bowl-shaped, such that its side walls 13 limit a receiving space 14 in which the base body 3 is partially received or arrangeable.

On two opposing side walls 13 of the actuating element, the respective catching element 12 is formed, extending inwardly in the radial direction.

The catching element 12 can be formed in the manner of a resilient catching arm, wherein the corresponding side wall 13 forms the arm and the catching element 12 is formed by a corresponding groove with a catching edge.

A retaining force between the catching element 12 of the actuating element 4 and the pre-assembly catching element 10 of the base body 3 is greater than the total spring force of all spring elements 7 in a pre-assembly position 15, such that the actuating element 4 is only transferable into a final assembly position 16 and its catching element 12 can only be brought into engagement with the fastening catching element 11 of the base body 3 when the spring elements 7 are biased in such a way that the apparatus 1 can be subjected to a predetermined spring force acting counter to the assembly direction.

The fastening element 5 comprises an approximately cylindrical receiving portion 17 for receiving a retaining device 18 connected to the carrier component 2.

A radially inwardly extending first catching means 19 is formed on an inner sheath wall of the receiving portion 17 of the retaining device 18.

The retaining device 18 of the carrier component comprises second catching means 20 formed to correspond to the first catching means 19 of the base body 3. The second catching means 20 is preferably formed as a thread, wherein the retaining device 18 is a corresponding threaded bolt.

Accordingly, the first catching means 19 is formed as threaded portions on the receiving portion 17.

In addition, the apparatus 1, in particular the actuating element 4, can comprise an engine for being able to unscrew the apparatus from a retaining device 18 of a carrier component. This engine can be formed as a Torx, internal hexagonal, external hexagonal, slotted, or cross/slitted connection.

Figure 1:
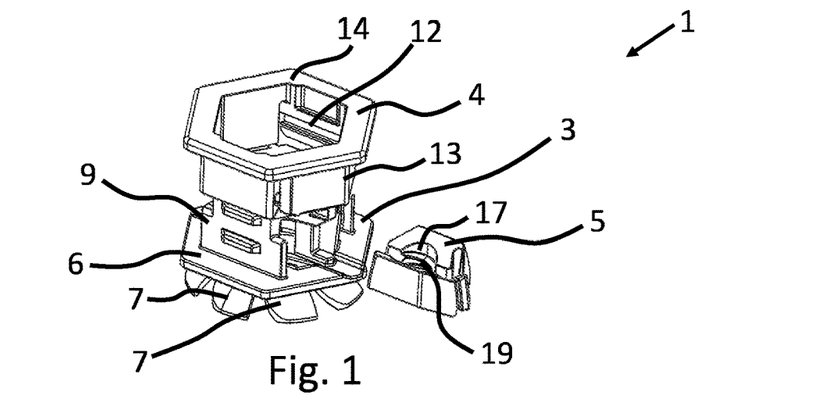
FIG. 1 a perspective view of an apparatus according to the invention in a home position.
Figure 2:
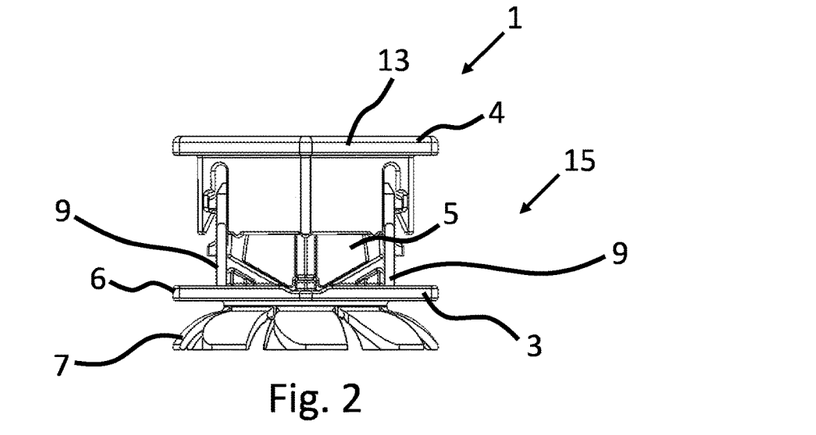
FIG. 2 a side view of the apparatus according to the invention in a pre-assembly position.
Figure 3:
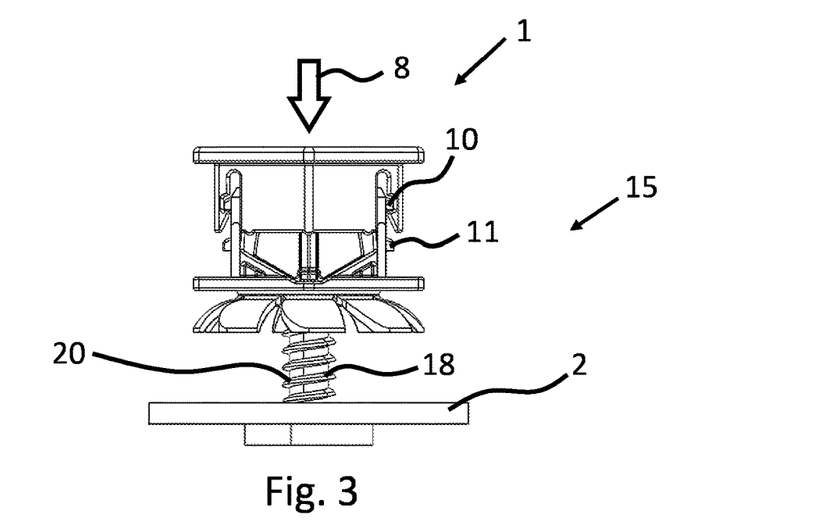
FIG. 3 a side view of the device according to the invention in a pre-assembly position, arranged on a retaining device of a carrier component.

According to a corresponding method for assembling the apparatus 1 according to the invention, it is now provided that the apparatus 1 is arranged with its base wall 6 on a retaining device 18 of a carrier component 2 (FIG. 3).

The actuating element 4 is then exposed to a force acting in the assembly direction.

Figure 4:
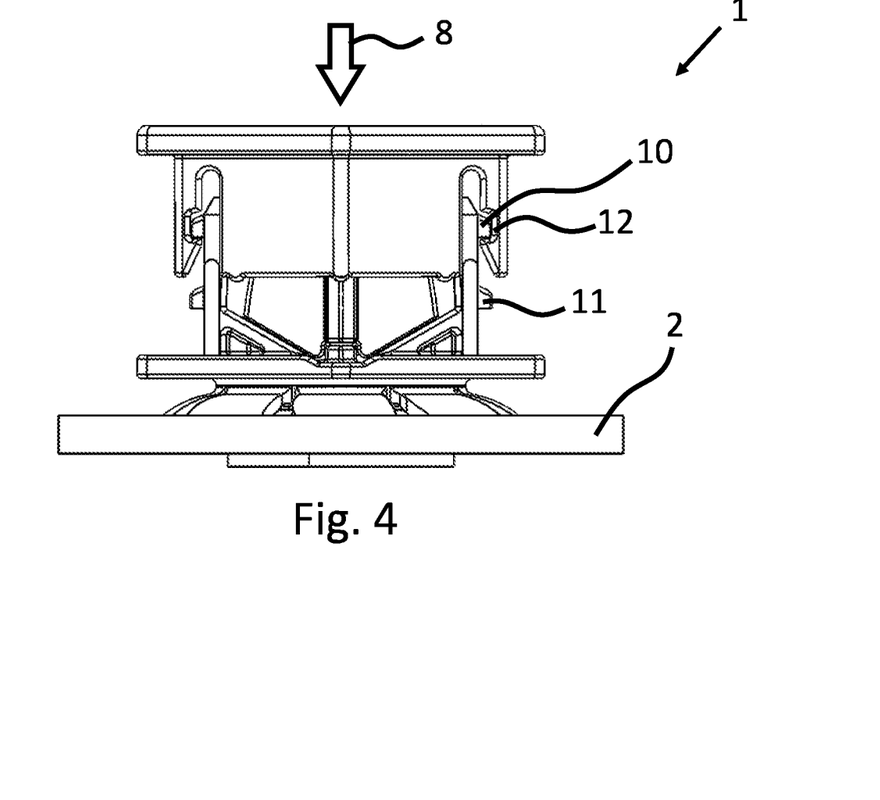
FIG. 4 the view from FIG. 3 in a pre-assembly position.

A connection between the pre-assembly catching elements 10 and the catching elements 12 of the base body remains in place until the spring elements 7 contact a surface of the carrier component 2 and are displaced counter to the assembly direction in such a way that the apparatus 1 is subject to a spring force acting counter to the assembly direction 8 by the spring elements.

Figure 5:
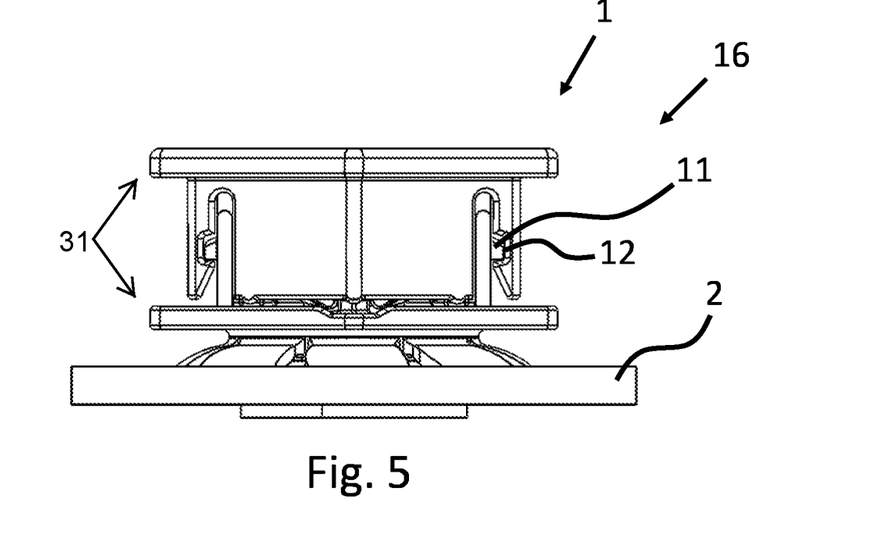
FIG. 5 the view from FIG. 3 in a final assembly position.
Figure 6:
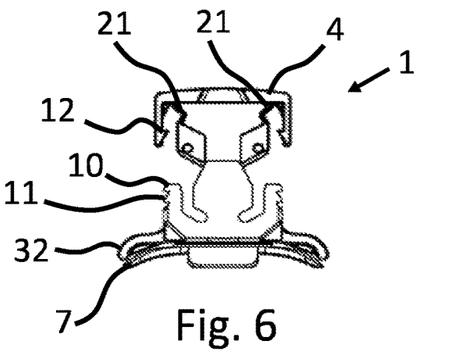
FIG. 6 a side view of the apparatus according to the invention according to a second exemplary embodiment.
Figure 7:
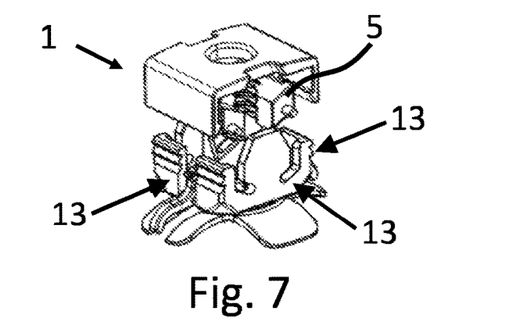
FIG. 7 a perspective view of the apparatus.
Figure 8:
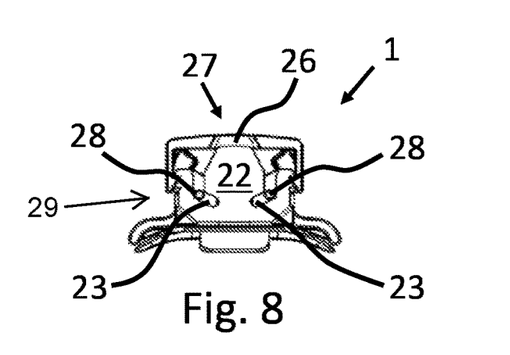
FIG. 8 a side view of the apparatus according to the invention in a pre-assembly position.
Figure 9:
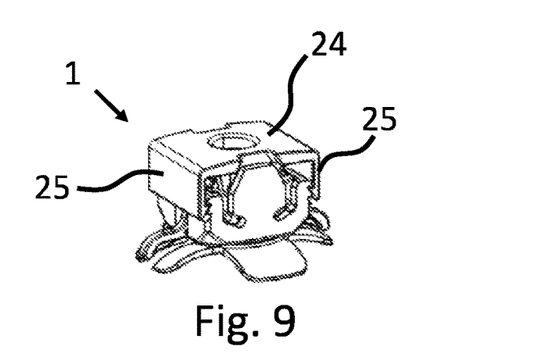
FIG. 9 a perspective view of the apparatus in a pre-assembly position.
Figure 10:
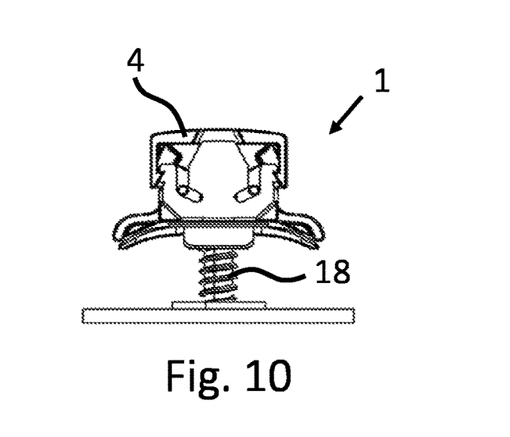
FIG. 10 a side view of the apparatus in a state of being arranged on a retaining device of a carrier element in the pre-assembly position.
Figure 11:
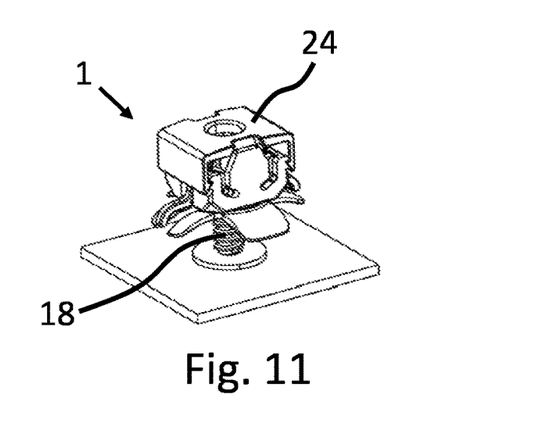
FIG. 11 a perspective view of FIG. 10.
Figure 12:
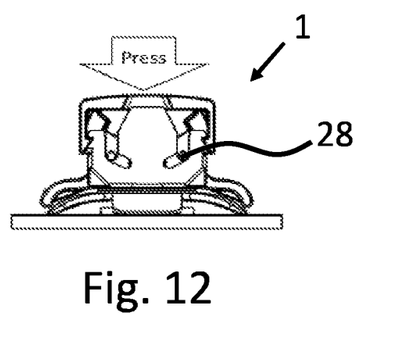
FIG. 12 a side view of the apparatus arranged on a retaining device of a carrier component in a pre-assembly position.
Figure 13:
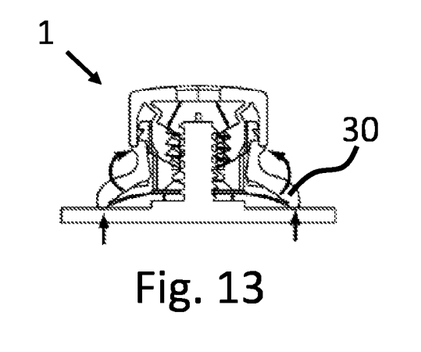
FIG. 13 a further lateral view of the illustration from FIG. 12.

Only when a sufficiently large spring force is present do the pre-assembly catching elements 10 of the base body 3 become disengaged from the catching elements 12 of the actuating element 4, so that the actuating element 4 is slidable in the assembly direction 8 until the catching elements 12 enter into engagement with the catching elements 11.

Once engaged with each other, a final assembly position is achieved, and is thus safely and reliably retained by the corresponding catch connection.

In particular, the actuating element 4 forms an assembly verification device 31, because the apparatus has reduced its construction height in the assembly direction 8 upon reaching the final assembly position. This can immediately be determined safely and reliably by a user by way of a simple visual inspection.

In the following, the apparatus 1 according to the invention is described based on a second exemplary embodiment (FIGS. 6 to 15). Unless otherwise described, the apparatus 1 according to the second exemplary embodiment of the invention has the same technical features as the apparatus 1 according to the first exemplary embodiment. The same technical features bear the same reference numerals.

By contrast to the first exemplary embodiment, in the apparatus 1 according to the invention according to the second exemplary embodiment, it is provided that the fastening element 5 is connected to the actuating element 4 via spring arms 21.

Four side walls 13 formed from portions and arranged orthogonally to the base wall 6 are provided on the base wall 6. Here, the pre-assembly catching elements 10 and the fastening catching element 11 each comprise two opposing side wall portions of a side wall 13.

The two remaining side walls, which are also opposite one another, form a stop element 22. The stop element 22 is formed in order to conically flare in the assembly direction 8.

Guide grooves 23 are formed in the region between the stop element 22 and the side walls 13 comprising the pre-assembly catching elements 10 and the fastening catching elements 11.

The actuating element 4 comprises a ceiling wall 24 and two opposing catching walls 25 (9). A catching element 12 is formed on each of the catching walls 25. In the region of the stop element, the ceiling wall comprises a stop recess 26 which conically flares in the assembly direction 8.

The stop element 22 forms a stop device 27 in connection with the stop recess 26.

According to this exemplary embodiment, the fastening element 5 is also formed in a bracket-like manner and, as explained above, is connected to the ceiling wall 24 of the base body via two spring arms 21.

Furthermore, correspondingly configured guide pins 28 are formed on the fastening element 5 in the region of the guide grooves 23 of the base body.

The guide grooves 23 together with the guide pins 28 form a corresponding guide device 29 for the fastening element 5.

The fastening element 5 is first guided in the assembly direction via the guide pins 28 upon transferring from a pre-assembly position 15 into a final assembly position 16, wherein, upon reaching the final assembly position 16, the guide grooves are formed in order to run toward the receiving space.

By means of the guide device 29, the fastening element 5 is thus subjected to a force approximately orthogonal to the assembly direction 8 in order to safely and reliably connect a thread 20 of a retaining device 18 to corresponding threaded sections (first catching means 19).

Furthermore, in the region between the spring elements 7, a release arm 30 is hingedly connected to the base body 3.

Figure 14:
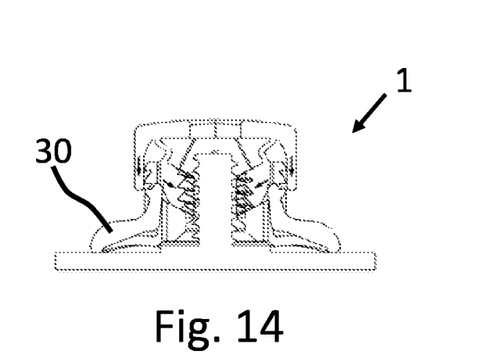
FIG. 14 a further side view of the apparatus with a release arm in the loosened state.
Figure 16:
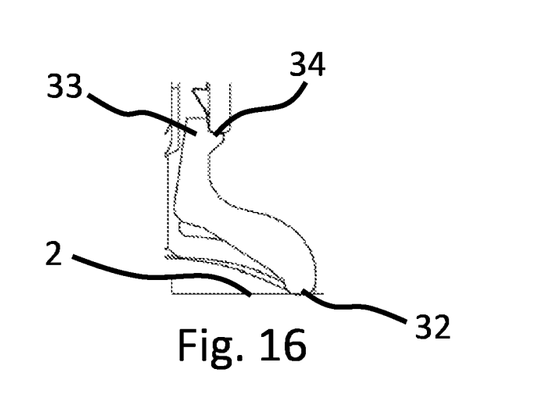
FIG. 16 a detail view of the release arm upon contacting an actuating element.
Figure 17:
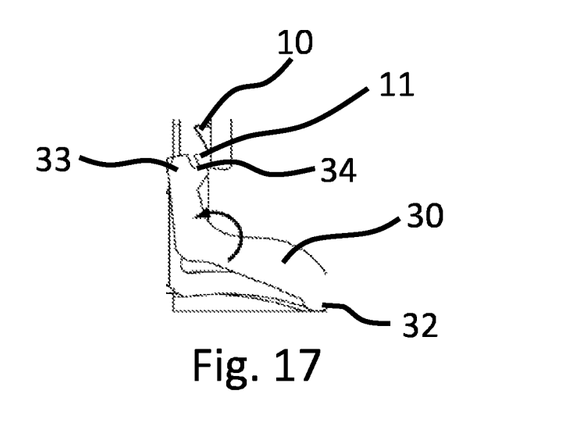
FIG. 17 a detail view of the release arm while the release element releases the actuating element.

The release arm 30 is a component of the assembly verification device 31.

A first end 32 of the release arm is formed in order to contact a surface of the carrier component 2 in such a way that the release arm 30 is set into a pivoting motion by contacting the surface of the carrier component 2.

A second end 33 of the release arm 30 has a catching edge 34 that contacts an edge of the actuating element 4 in such a way that the actuating element 4 is fixed in the assembly direction 8.

The second end 33 releases the actuating element 4 by the pivoting movement of the release arm in such a way that it is slidable in the assembly direction 8.

According to a method for fastening the apparatus 1 according to the invention according to the second exemplary embodiment, it is now provided that the actuating element 4 is subjected to a force acting in the assembly direction.

The catching elements 12 of the actuating element 4 are re-engaged with the pre-assembly catching members 10 of the base body 3.

Figure 15:
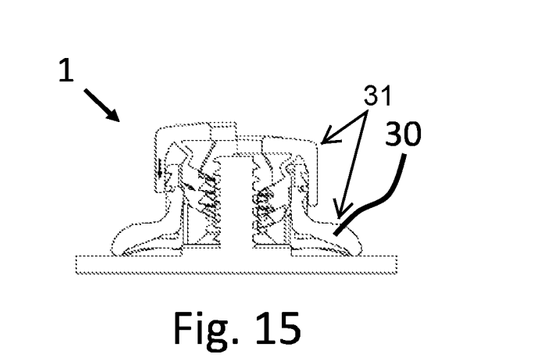
FIG. 15 a schematic, laterally sectioned view of the apparatus upon transfer from the pre-assembly position into the final assembly position.

Once the spring elements 7 contact a surface of the carrier component 2, they are moved counter to the assembly direction in order to generate a predetermined spring or biasing force. As soon as the first end of the release arm 30 contacts the surface of the carrier component 2, the release arm 30 performs a pivoting movement such that the catching edge 34 of the second end 33 of the release arm releases the actuating element 4. The apparatus can then be transferred from the pre-assembly position 15 into the final assembly position 16.

The fastening element 5 or its guide pins 28, which are supported in the guide grooves 23 of the base body, are moved toward the retaining device 18 by the application of a force acting in the assembly direction until the first catching means 19 is safely and reliably engaged with the second catching means 20.

A displacement of the actuating element 5 in the assembly direction 8 is limited by the corresponding stop device 27.

In this way, the final assembly position can be safely and reliably achieved, wherein the apparatus 1 or a component connected thereto (not shown) is subjected to a predetermined biasing force or a corresponding spring force, and wherein the low design height of the apparatus 1 connected thereto in the assembly direction 8 is optically or visually verifiable via the assembly verification device 31.

Furthermore, according to the present invention, a method for manufacturing an apparatus as described above is provided, wherein a base body and/or an actuating element and/or preferably a fastening element are manufactured in at least one or more injection molding operations in a single injection molding apparatus, wherein this injection molding apparatus can be a component of a production system, in which the aforementioned components are arranged in a pre-assembly position with respect to one another.

In this way, the apparatus according to the invention can be easily manufactured. In addition, no further assembly steps are necessary in order to provide the pre-assembly position. A corresponding component can thus be delivered to a customer immediately after manufacture.

LIST OF REFERENCE NUMERALS

1 Apparatus
2 Carrier component

3 Base body
4 Actuating element
5 Fastening element
6 Base wall
7 Spring element
8 Assembly direction
9 Catching wall
10 Pre-assembly catching element
11 Assembly catching element
12 Catching element
13 Side wall
14 Receiving space
15 Pre-assembly position
16 Final assembly position
17 Receiving portion
18 Retaining device
19 First catching means
20 Second catching means
21 Spring arm
22 Stop element
23 Guide grooves
24 Ceiling wall
25 Catching wall
26 Stop recess
27 Stop device
28 Guide pin
29 Guide device
30 Release arm
31 Assembly verification device
32 First end
33 Second end
34 Catching edge

The invention claimed is:

1. Apparatus for fastening a component to a carrier component, comprising:
 a base body, wherein the base body comprises first catching means for fastening the apparatus to a carrier component, and
 an actuating element via which the apparatus can be subjected to a force acting in an assembly direction in order to transfer the apparatus from a pre-assembly position into a final assembly position, wherein the assembly direction extends orthogonally to a surface of a carrier component, and
wherein the actuating element comprises at least one catching element, which, in the pre-assembly position, engages with a correspondingly formed pre-assembly catching element of the base body and, in the final assembly position, engages with an assembly catching element of the base body, wherein a connection of the catching element to the assembly catching element verifies that the final assembly position is reached, such that the actuating element forms a visual assembly verification device;
 wherein the base body comprises a bracket fastening element that is arrangeable in a correspondingly formed fastening element receptacle of the base body, wherein the fastening element comprises the receiving portion and comprises the first catching means for fastening the apparatus to a carrier component;
 wherein the fastening element is connected to the actuating element via two spring arms in order to compensate for tolerances, or the fastening element is formed as a separate component.

2. The apparatus according to claim 1,
wherein
 the pre-assembly catching element and the fastening catching element are arranged axially offset from one another in the assembly direction such that, due to this offset, the apparatus has a lower construction height in the assembly direction in the final assembly position than in the pre-assembly position, so that the final assembly position is visually verifiable.

3. The apparatus according to claim 1,
wherein
 a plurality of spring elements are arranged approximately equally spaced apart from one another on the base body radially circumferentially, which extend approximately radially orthogonally to the assembly direction in such a way that the apparatus and a component fastened to the apparatus in the final assembly position can be subjected to a spring force acting counter to the assembly direction, wherein a retaining force between the catching element of the actuating element and the pre-assembly catching element of the base body in the pre-assembly position is greater than the total spring force of all spring elements, such that the actuating element is only transferable into the final assembly position and its catching element is only engageable with the assembly catching element of the base body when the spring elements are biased in such a way that the apparatus can be subjected to a predetermined spring force acting counter to the assembly direction.

4. The apparatus according to claim 1
wherein
 the base body comprises a receiving portion for receiving a retaining device connected to the carrier component, wherein the first catching means extends radially inward from an inner sheath wall of the receiving portion, and wherein the retaining device comprises second catching means that are formed to correspond to the first catching means of the base body.

5. The apparatus according to claim 1,
wherein
 a movement of the fastening element is guided for connecting to a retaining device via a guide device, wherein guide grooves and guide pins, formed correspondingly on the fastening element and guided into the guide grooves, are formed in the base body in order to guide a movement of the fastening element first in the assembly direction and then radially inwardly in the direction of the retaining device, such that the arms of the bracket fastening element can become engaged with the first catching means formed thereon with the second catching means of a retaining element.

6. The apparatus according to claim 1,
wherein
the assembly verification device comprises a release arm formed on the base body, being pivotally hinged to the base body, wherein a first end of the arm is formed in order to contact a surface of a carrier component in such a way that the release arm can be set into a pivoting motion by contacting a surface of the carrier component, wherein a second end of the arm contacts the actuating element in the pre-assembly position in such a way that the actuating element is fixed in the assembly direction, and wherein the second end releases the actuating element by the pivoting movement, such that it is slidable in the assembly direction.

7. The apparatus according to claim 1
wherein a stop apparatus is provided, which limits a movement of the actuating element in the assembly direction, wherein a stop recess that flares in the assembly direction is formed on the actuating element and a stop element that conically flares in the assembly direction is formed on the base body, which together form the stop apparatus.

8. Apparatus for fastening a component to a carrier component, comprising:
a base body, wherein the base body comprises first catching means for fastening the apparatus to a carrier component, and
an actuating element via which the apparatus can be subjected to a force acting in an assembly direction in order to transfer the apparatus from a pre-assembly position into a final assembly position, wherein the assembly direction extends orthogonally to a surface of a carrier component, and
wherein the actuating element comprises at least one catching element, which, in the pre-assembly position, engages with a correspondingly formed pre-assembly catching element of the base body and, in the final assembly position, engages with an assembly catching element of the base body, wherein a connection of the catching element to the assembly catching element verifies that the final assembly position is reached, such that the actuating element forms a visual assembly verification device;
wherein a plurality of spring elements are arranged approximately equally spaced apart from one another on the base body radially circumferentially, which extend approximately radially orthogonally to the assembly direction in such a way that the apparatus and a component fastened to the apparatus in the final assembly position can be subjected to a spring force acting counter to the assembly direction, wherein a retaining force between the catching element of the actuating element and the pre-assembly catching element of the base body in the pre-assembly position is greater than the total spring force of all spring elements, such that the actuating element is only transferable into the final assembly position and its catching element is only engageable with the assembly catching element of the base body when the spring elements are biased in such a way that the apparatus can be subjected to a predetermined spring force acting counter to the assembly direction.

9. Apparatus for fastening a component to a carrier component, comprising:
a base body, wherein the base body comprises first catching means for fastening the apparatus to a carrier component, and
an actuating element via which the apparatus can be subjected to a force acting in an assembly direction in order to transfer the apparatus from a pre-assembly position into a final assembly position, wherein the assembly direction extends orthogonally to a surface of a carrier component, and
wherein the actuating element comprises at least one catching element, which, in the pre-assembly position, engages with a correspondingly formed pre-assembly catching element of the base body and, in the final assembly position, engages with an assembly catching element of the base body, wherein a connection of the catching element to the assembly catching element verifies that the final assembly position is reached, such that the actuating element forms a visual assembly verification device;
wherein a stop apparatus is provided, which limits a movement of the actuating element in the assembly direction, wherein the stop apparatus comprises a stop recess that flares in the assembly direction and is formed on an external upper edge portion of the actuating element and a stop element that conically flares in the assembly direction and is formed on the base body.

* * * * *